(No Model.)

W. H. CRANDALL.
MANURE SPREADER.

No. 269,183. Patented Dec. 19, 1882.

Witnesses
S. N. Piper
C. S. Pratt

Inventor.
Wm. H. Crandall.
by R. H. Eddy atty

N. PETERS, Photo-Lithographer, Washington, D. C.

UNITED STATES PATENT OFFICE.

WILLIAM H. CRANDALL, OF STOWE, MASSACHUSETTS.

MANURE-SPREADER.

SPECIFICATION forming part of Letters Patent No. 269,183, dated December 19, 1882.

Application filed July 31, 1882. (No model.)

*To all whom it may concern:*

Be it known that I, WILLIAM H. CRANDALL, of Stowe, in the county of Middlesex, of the State of Masssachusetts, have invented a new and useful Improvement in Manure-Spreaders; and I do hereby declare the same to be described in the following specification, and represented in the accompanying drawings, of which—

Figure 1:
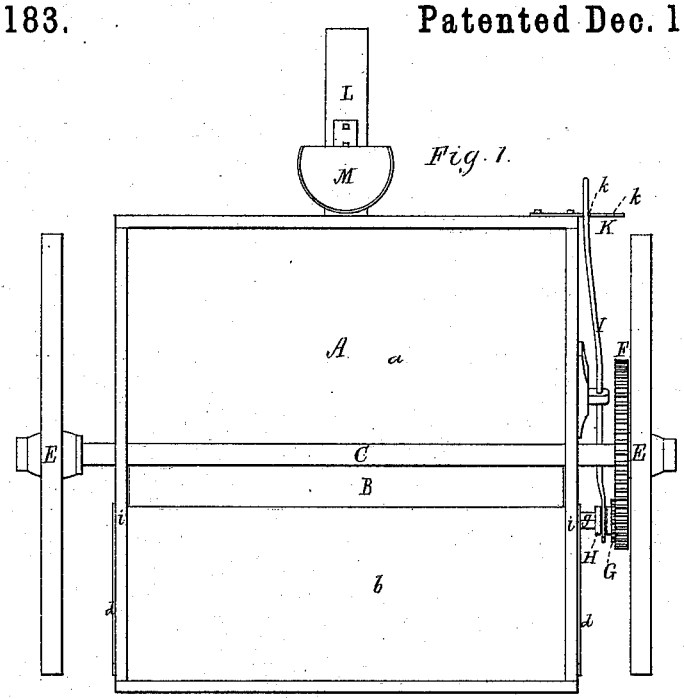
Figure 2:
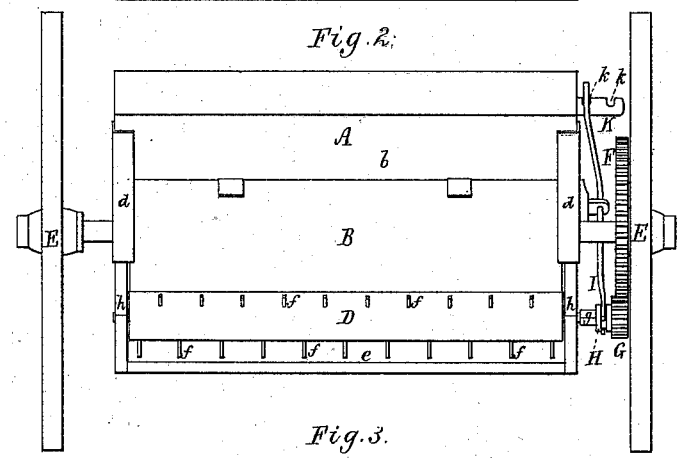

Figure 1 is a top view, Fig. 2 a rear elevation, and Fig. 3 a central and longitudinal section, of a manure-spreader embracing my invention, the nature of which is defined in the claim hereinafter presented.

Figure 3:
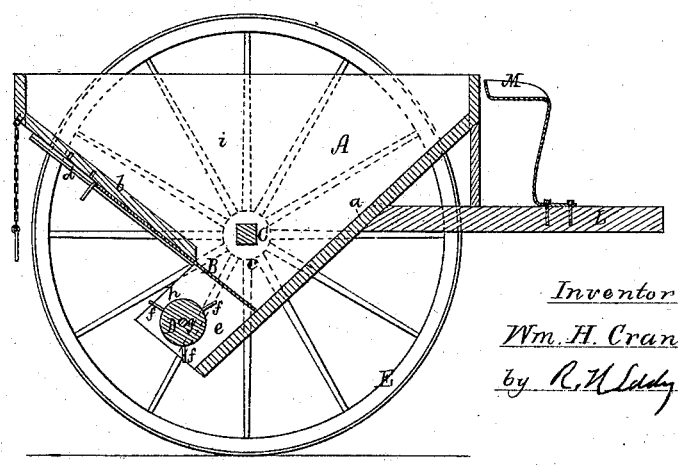

The body of the said spreader consists of a hopper, A, whose front inclined side, $a$, is extended below and beyond the rear inclined side, $b$, in manner as shown in Fig. 3, there being a space or opening, $c$, between the side $a$ and the lower edge of the side $b$. There is adapted to the side $b$ a gate, B, to slide upward and downward relatively to the side $a$, and in suitable guides, $d\ d$, affixed to the hopper. This gate is to close, more or less, the said opening $c$. Directly in rear of the gate and over the chute, or that part $e$ of the front side, $a$, which extends downward beyond the gate, is a cylinder, D, provided with several ranges of teeth, $f$, projecting radially from its periphery, the shaft $g$ of such cylinder being supported in suitable bearings in portions $h\ h$ of the ends $i\ i$ of the hopper produced rearward beyond the side $b$, in manner as shown. The hopper has a shaft or axle, C, extending through and fixed in it, medially of it and above its educt, and provided with two wheels, E E, to revolve freely on journals, and arranged with the hopper in manner as represented. By having the axle arranged within the hopper medially thereof and above its discharging opening or chute, not only is the hopper or its load balanced on the axle, to the advantage of the draft animal or animals, but the hopper can be made with its front and rear sides inclined, as represented, in order for each to assist in discharging the load; and, besides, the chute and its delivery-cylinder C can be brought near the ground, and the cylinder be operated by gears without materially disturbing the equilibrium of the hopper or its load, all of which are matters productive of advantage in the construction and using of a manure-spreader. To the hub or spokes of one of these wheels there is fixed a gear, F, to engage with a pinion, G, carried by a sleeve, H, that slides on the shaft $g$, on a part thereof which is made prismatic to cause the pinion, when revolving, to revolve the shaft. A forked lever, I, fulcrumed to the hopper and arranged as shown, and inserted in a groove of the sleeve H, serves to enable an attendant on the spreader to move the pinion either into or out of engagement with the gear, as occasion may require. Extending from the hopper is an arm, K, provided with two notches, $k\ k$, to receive the lever and determine its two positions. The hopper has a short tongue, L, and it may have thereto a driver's seat, M, arranged as shown. This tongue is to connect it with a wagon or with a larger and additional tongue, or with thills, as may be desirable.

When the spreader is being drawn along the toothed cylinder will be revolved, and entering the manure falling out of the hopper and passing over its chute will throw off or spread such manure upon the surface of the ground.

Another advantage results from having the axle go through the hopper, as in such case the axle will operate to prevent the load from packing too strongly in the lower part of the hopper, it causing the load to be divided at its middle in descending in the hopper, whereby it is kept looser, so as to readily escape into the chute, to be acted on by the toothed cylinder on the gate being opened.

I do not claim a fertilizer-distributer wherein the axle is entirely outside of the hopper and not midway thereof, as in my machine, and two toothed shafts are necessary to the hopper, and the hopper-boards are slotted for the teeth of the lower shaft to revolve through them.

When the tongue of the spreader may be resting on the ground the hopper becomes tipped into a convenient position for being supplied with manure, and the front side of the hopper will be horizontal, or nearly so, the manure being thereby prevented from falling out of the chute, even when the gate thereof is open.

What I claim in the described manure-spreader is—

The hopper having its front and rear sides inclined downward toward each other, and its front inclined side, a, extended rearward under and beyond the rear inclined side, b, with a discharging space or opening, c, between them, as shown, and also having its ends extended in rear of its rear side, as represented, in combination with the axle C, arranged medially in the said hopper and above its chute, and a gate, B, applied to such rear inclined side and space, and with a toothed cylinder, D, arranged in rear thereof and over the extended part e of the front side and between the end extensions, and provided with mechanism for operating the said cylinder, all being substantially as set forth.

WILLIAM H. CRANDALL.

Witnesses:
GEO. H. JACKSON,
JOHN HANIFORD.